US010024106B2

(12) United States Patent
Sadeghi et al.

(10) Patent No.: US 10,024,106 B2
(45) Date of Patent: Jul. 17, 2018

(54) SYSTEM FOR NON-DESTRUCTIVE PENETRATION OF A SUBSTRATE

(71) Applicant: FONDAZIONE ISTITUTO ITALIANO DI TECNOLOGIA, Genoa (IT)

(72) Inventors: Ali Sadeghi, Genoa (IT); Barbara Mazzolai, Genoa (IT)

(73) Assignee: FONDAZIONE ISTITUTO ITALIANO DI TECHNOLOGIA, Genoa (IT)

( * ) Notice: Subject to any disclaimer, the term of this patent is extended or adjusted under 35 U.S.C. 154(b) by 435 days.

(21) Appl. No.: 14/904,229

(22) PCT Filed: Jul. 1, 2014

(86) PCT No.: PCT/IB2014/062758
§ 371 (c)(1),
(2) Date: Jan. 11, 2016

(87) PCT Pub. No.: WO2015/004572
PCT Pub. Date: Jan. 15, 2015

(65) Prior Publication Data
US 2016/0168915 A1 Jun. 16, 2016

(30) Foreign Application Priority Data

Jul. 12, 2013 (IT) .............................. TO2013A0588

(51) Int. Cl.
*E21B 7/20* (2006.01)
*B05C 5/00* (2006.01)
(Continued)

(52) U.S. Cl.
CPC ................ *E21B 7/208* (2013.01); *B05C 5/00* (2013.01); *B29C 67/0014* (2013.01);
(Continued)

(58) Field of Classification Search
None
See application file for complete search history.

(56) References Cited

U.S. PATENT DOCUMENTS 3,633,674 A * 1/1972 Brieger ................... E21B 43/08
166/231
4,377,985 A * 3/1983 Reba ..................... B05B 7/0807
118/300

(Continued)

OTHER PUBLICATIONS

International Search Report and Written Opinion for corresponding International Patent Application No. PCT/IB2014/062758, dated Sep. 29, 2014.

*Primary Examiner* — Jethro M Pence
(74) *Attorney, Agent, or Firm* — Merchant & Gould P.C.

(57) ABSTRACT

A system includes an excavation assembly, which in turn includes a supporting body having a perimetric edge defining a closed path. A distribution apparatus protrudes transversally relative to the perimetric edge and is movable in a guided manner on the supporting body. The distribution apparatus transversally distributes a quantity of hardenable or solidifiable material towards the outside of the perimetric edge, so as to be able to lay a plurality of axially superimposed annular layers(s) of the hardenable or solidifiable material defining a tubular structure (T) around the excavation assembly. A motor device moves the distribution apparatus on the supporting body.

23 Claims, 7 Drawing Sheets

(51) Int. Cl.
*E21B 43/10* (2006.01)
*E21B 17/10* (2006.01)
*E21B 17/22* (2006.01)
*B29C 67/00* (2017.01)
*B29C 53/78* (2006.01)

(52) U.S. Cl.
CPC .......... *E21B 17/1007* (2013.01); *E21B 17/22* (2013.01); *E21B 43/10* (2013.01); *B29C 53/78* (2013.01)

(56) References Cited

U.S. PATENT DOCUMENTS

| | | |
|---|---|---|
| 5,074,943 A | 12/1991 | Menzel |
| 5,813,484 A * | 9/1998 | Ekstrom ................. E21B 7/208 175/293 |
| 6,234,226 B1 | 5/2001 | Kitahashi et al. |
| 6,637,092 B1 | 10/2003 | Menzel et al. |
| 2002/0179306 A1 | 12/2002 | Johnson et al. |
| 2004/0013472 A1 | 1/2004 | Akimoto et al. |
| 2007/0034408 A1* | 2/2007 | Benzie ................... E21B 7/208 175/57 |
| 2015/0300151 A1* | 10/2015 | Mohaghegh ........ E21B 41/0007 702/9 |

* cited by examiner

SYSTEM FOR NON-DESTRUCTIVE PENETRATION OF A SUBSTRATE

This application is a National Stage Application of International Patent Application No. PCT/IB2014/062758, filed 1 Jul. 2014, which claims benefit of Serial No. TO2013A000588, filed 12 Jul. 2013 in Italy and which applications are incorporated herein by reference. To the extent appropriate, a claim of priority is made to each of the above disclosed applications.

TECHNICAL FIELD

The present invention relates to a system for non-destructive penetration of a substrate.

BACKGROUND ART

Drilling and excavation through the use of appropriate mechanisms are the techniques that are traditionally employed in order to gain access through a substrate, typically the subsoil, for different applications (searching for water and fossil fuels, geological studies, etc.) and different targets (collection or deposition of materials, simple opening of a passage towards the surface). Many techniques of mechanical nature are commonly used, which include, for example, quasi-static thrust, rotation, percussion, vibration, and combinations thereof.

Although these traditional systems have achieved good levels of effectiveness over the years, they still suffer from a few drawbacks.

One drawback is that they at least partially alter or even destroy the substrate and may require high energy consumption.

SUMMARY OF THE INVENTION

It is one object of the present invention to provide a system for non-destructive penetration of a substrate, which can overcome the drawbacks of the prior art while at the same time being simple and economical to manufacture.

It is another object of the present invention to provide a system which can reduce peripheral friction during the penetration through the substrate, and which is suitable for use in combination with traditional drilling and excavation equipment, so as to improve the efficiency thereof.

It is a further object of the present invention to provide a system which can perform non-destructive penetration through a wide range of substrates, whether incoherent or coherent, including soil and also organic tissues for medical applications.

It is yet another object of the present invention to provide a system adapted to form a hollow tubular structure during the penetration process, so as to create a duct or channel through the substrate being penetrated by the system.

According to the present invention, these and other objects are achieved through a system for non-destructive penetration of a substrate wherein said system comprises an excavation assembly, in turn comprising:
  a supporting body having a perimetric edge defining a closed path; and
  a distribution apparatus at least partly protruding transversally beyond said perimetric edge, movable in a guided manner on said supporting body, and for transversally distributing a quantity of hardenable or solidifiable material towards the outside of said perimetric edge, so as to be able to lay a plurality of axially superimposed annular layers of said hardenable or solidifiable material defining a tubular structure around said excavation assembly; and
  a motor device for moving said distribution apparatus on said supporting body.

Thanks to the above features, the system can, on the one hand, ensure substrate penetration with substantially no significant friction through the movement of the distribution apparatus and the resulting addition of an annular layer of said hardenable or solidifiable material; on the other hand, the system can cause the tubular structure generated by the movable distribution apparatus to grow, forming a duct that is open towards the outside.

In particular, the behaviour of the system designed in accordance with the present invention is substantially similar to that of plant roots, which can penetrate the soil as they grow, becoming longer and developing at their tip, while the rest of their structure is stationary and bound to the soil. In other words, the non-destructive penetration system develops the tubular structure by feeding material that is peripherally distributed by the distribution apparatus, thereby adapting itself to the substrate environment. In particular, the layers of new material are deposited by the distribution apparatus near the periphery of the supporting body, thereby causing the tubular structure to grow in a substantially axial direction.

Furthermore, said features of the system also imply the advantage that the localized growth of the tubular structure makes it easier to overcome the resistance to penetration of granular or clayey substrates. In other words, as the system is penetrating the substrate, the only part of the tubular structure that is moving is essentially the one located at the tip, where new annular layers grow (and where there is still a dynamic friction force), while the rest of the tubular structure remains substantially still.

Technical teachings are provided in the following detailed description of the invention. In particular, preferred embodiments of the present invention which include some optional technical features are provided.

BRIEF DESCRIPTION OF THE DRAWINGS

Further features and advantages of the invention will become apparent from the following detailed description, which is supplied by way of non-limiting example with particular reference to the annexed drawings, wherein.

As can be understood, unless otherwise specified the drawings to which reference will be made herein are not in scale, the aim thereof being to illustrate the principles of the present invention.

DETAILED DESCRIPTION OF THE INVENTION

With particular reference to FIGS. 1 to 6, reference numeral 10 designates as a whole a system for non-destructive penetration of a substrate designed in accordance with one embodiment of the present invention.

As aforementioned, system 10 can perform non-destructive penetration through a wide range of substrates, whether incoherent or coherent, including not only soil (whether granular, clayey, slimy or compact) but also organic tissues, e.g. for medical applications.

System 10 comprises an excavation assembly 11, in turn comprising:
- a supporting body 12 having a perimetric edge 16 defining a closed path; and
- a distribution apparatus 18 at least partly protruding transversally relative to perimetric edge 16, movable in a guided manner on supporting body 12, for transversally distributing a quantity of hardenable or solidifiable material towards the outside of perimetric edge 16, so as to be able to lay a plurality of axially superimposed annular layers s of the hardenable or solidifiable material defining as a whole a tubular structure T around excavation assembly 11 (see in particular FIGS. 4 and 5); and
- a motor device 20 for moving the distribution apparatus on supporting body 12.

Thanks to the above features, system 10 is adapted to generate tubular structure T through a technique of additive production by stratification. More in detail, as will be further described hereafter, the movement of distribution apparatus 18 controlled by motor device 20 relative to supporting body 12 allows distribution apparatus 18 to distribute the hardenable or solidifiable substance (typically through an outlet passage, such as an orifice, a duct, a channel, etc.) in a substantially continuous manner in proximity to perimetric edge 16.

In other words, the quantity of material fed by distribution apparatus 18 grows and stratifies, wherein annular layers s substantially comprise a plurality of axially superimposed coils wound one on top of the other. In this manner, the new material to be deposited becomes stratified, surrounding perimetric edge 16 and arranging itself under the already deposited material.

Moreover, the already deposited material tends to remain peripherally stationary, in contact with the substrate that system 10 is penetrating. This behaviour allows system 10 to penetrate the substrate with a significant reduction of friction effects, particularly between the inner side walls of the bore being made and the outer side walls of tubular structure T generated by system 10.

In addition, tubular structure T that is generated during the excavation can be used for multiple functions, including distribution of materials or instruments, e.g. water, oxygen or other gases, food, medicaments, etc. Thus, system 10 is useful not only for soil drilling or excavation operations, but also for exploration, aid and medical applications.

More in detail, it should be noted that such a system may be used to advantage for monitoring and maintaining pipes (such as oil, gas or water pipes) without having to stop or interrupt the fluid flow within said pipes. Furthermore, for medical applications, surgical situations are conceivable wherein the surgeon wants to create non-invasive passages during particularly difficult and risky operations, e.g. in neurosurgery to create paths that must not intersect particular cerebral regions, or in endoscopy to prevent tissues from being subject to stresses (e.g. traction) that might cause pain to the patient. In general, it is also conceivable to install sensors on excavation assembly 11 (in particular at the distal end or tip of the supporting body 12).

The material distributable by distribution apparatus 18 for making tubular structure T may be used in different ways and may include various types of substances. For example, such material may be distributed in thread, powder, paste, gel or liquid form capable of hardening or solidifying, preferably in a short time. Of course, higher hardening or solidification speeds accelerate the whole process of formation of tubular structure T. Usable materials may include different substances, among which polymeric substances (e.g. thermoplastic or thermosetting ones), cement-based substances, textile fibres (e.g. cotton fibres), metallic materials, etc.

Preferably, the material distributable by distribution apparatus 18 is in thread form, which offers the advantage of simplifying the transfer of the substance in use (typically stored in a warehouse or tank) to distribution apparatus 18, particularly when depth penetration is required and a particularly long tubular structure T needs to be created.

By way of example, the possible substances that can be used in thread form include those substances which are typically used for fused deposition modeling (FDM), e.g. polymeric threads (particularly thermoplastic ones, such as ABS, PLA, etc.), cloth threads or textile material (particularly cotton), metal wires (possibly subjected to heating before being distributed by distribution apparatus 18), etc.

In the illustrated embodiment, supporting body 12 comprises a side wall 14 with perimetric edge 16. In particular, perimetric edge 16 is situated at the distal end or tip 14a (i.e. the end operationally facing towards the substrate to be subjected to non-destructive penetration) of side wall 14.

Preferably, side wall 14 has an axial cavity 14b (e.g. a through cavity), through which distribution apparatus 18 is accessible from the outside. Due to this feature, when system 10 is in operation axial cavity 14b can constitute a passage useful for supplying the material to be deposited to distribution apparatus 18, as well as for supplying power to motor device 20.

In the embodiment shown in FIGS. 1 to 6, side wall 14 is substantially cylindrical; in particular, the cross-section thereof is substantially circular. However, as it will be apparent to those skilled in the art, and with reference to the general definition of a cylinder (understood as the place of straight generatrices, parallel to a predetermined direction and passing through the single points of a given curve, whether planar or oblique, called directix), in order to implement the present invention it is not strictly necessary that said cross-section has a circular shape, since it may have a differently shaped profile, e.g. defined by any closed path or line. Some possible alternative shapes of the profile of the cross-section of side wall 14 are the square shape and the oval shape. For completeness' sake and by way of example, reference should be made to FIGS. 11 and 12 relating to a further exemplary embodiment of the present invention, which show a peculiar, substantially figure-of-eight shaped profile of the cross-section of side wall 14.

In further variants of the present invention, the overall shape of side wall 14 may also be other than cylindrical, e.g. a truncated cone, in particular tapering away from distal end 14a.

Preferably, distribution apparatus 18 is rotoidally coupled to side wall 14. In the embodiment shown in FIGS. 1 to 6, side wall 14 of supporting body 12 has a circular cross-section, and distribution apparatus 18 is rotoidally coupled to said side wall 14. In particular, the outer surface of distribution apparatus 18 is rotoidally coupled to the inner surface of side wall 14, in this embodiment through interposition of motor device 20.

Optionally, distribution apparatus 18 comprises a disk 21 at least partially protruding beyond perimetric edge 16 and equipped with a substantially radial outlet passage 22 and capable of distributing the hardenable or solidifiable material, which is adapted to contribute to the making of tubular structure T. Disk 21 extends peripherally from axial end or tip 14a of side wall 14. However, in further implementation variants the distribution apparatus may employ devices other than disk 21 (e.g. see the embodiment shown in FIGS. 11 and 12, which will be described hereafter).

Preferably, disk 21 also abuts axially against distal end 14a of side wall 14, in particular creating an annular support.

In the embodiment shown in FIGS. 1 to 6, outlet passage 22 is adapted to be crossed by the hardenable material, e.g. including a textile thread. Said thread may be made of cotton, suitably coated externally with an adhesive element or glue, e.g. a chemical adhesive, a thermoadhesive polymer, a dry adhesion medium (such as a self-clinging coating, including products belonging to the Velcro® family), a coating hardenable or crosslinkable by UV rays, etc. In this manner, adhesion can be provided between the stacked annular thread layers s, so that the various thread sections can be axially constrained to each other and then "harden" to form tubular structure T.

In particular, outlet passage 22 is provided in the form of a groove that can be run over by the hardenable material, e.g. formed on disk 21 across side wall 14; in this case, the hardenable material will enter the section of said groove that is situated inside supporting body 12, and will exit through the section of said groove that is situated outside supporting body 12, underneath axial end or tip 14a of side wall 14. As an alternative, said outlet passage 22 may be provided in the form of an orifice, a cutout or a duct through which the hardenable material can pass from the inside to the outside of supporting body 12.

Figure 1:
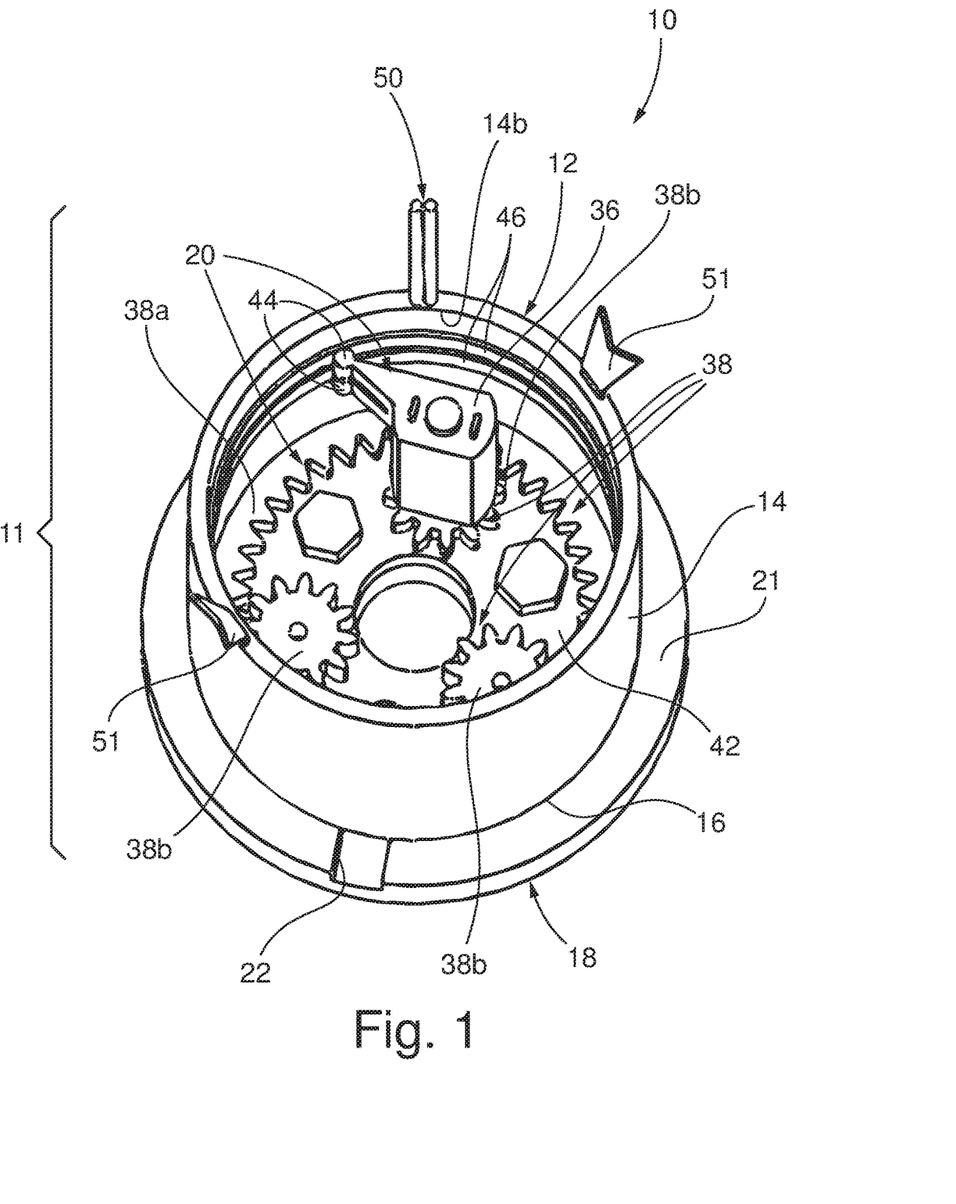
FIGS. 1, 2 and 3 are a perspective top view, a top plan view and a longitudinal sectional view of a system for non-destructive penetration of a substrate designed in accordance with one embodiment of the present invention.
Figure 2:
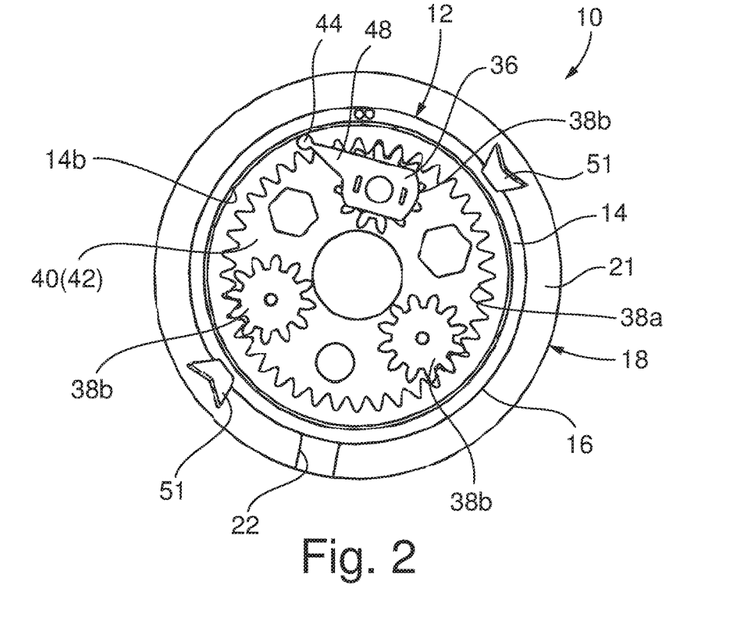
Figure 3:
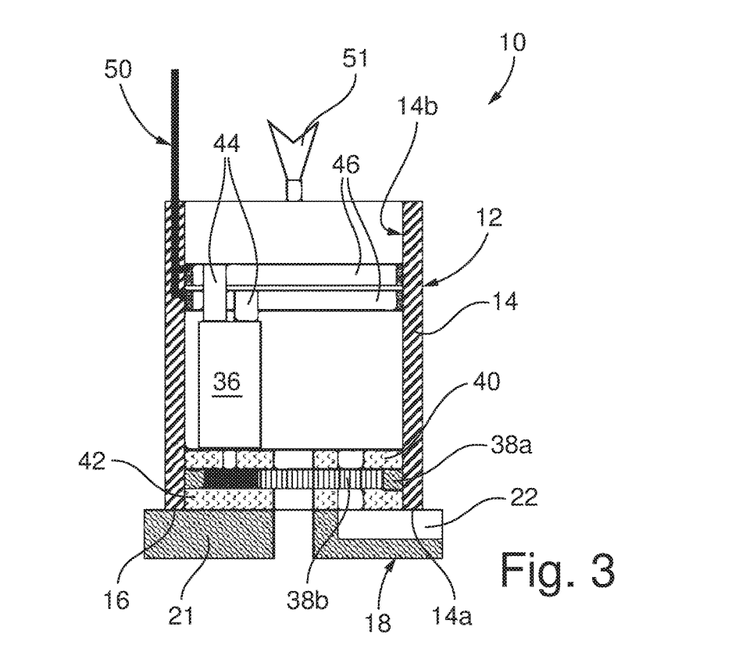
Figure 4:
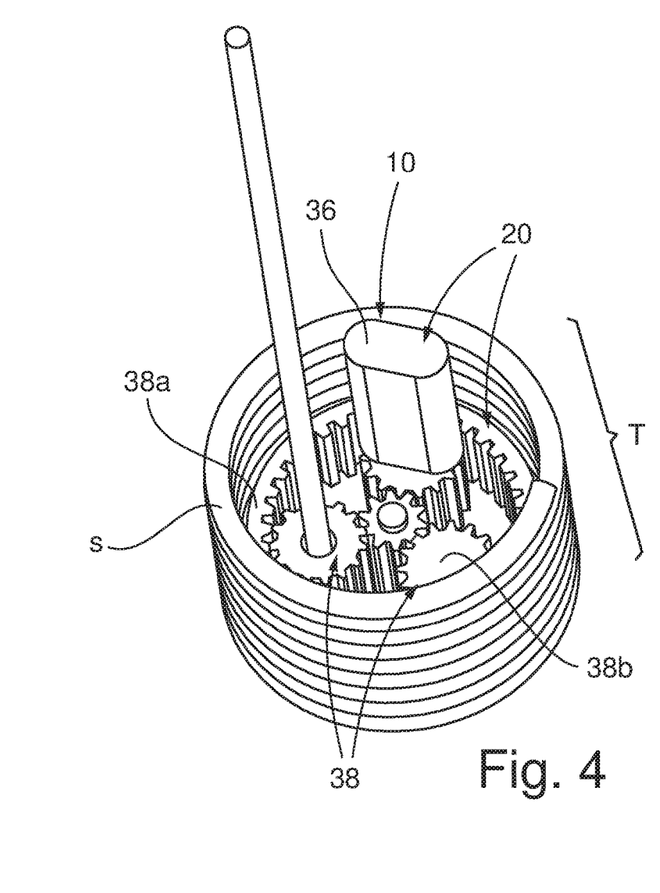
FIGS. 4 and 5 are perspective views in different positions of the system shown in the preceding figures during an operational drilling step.
Figure 5:
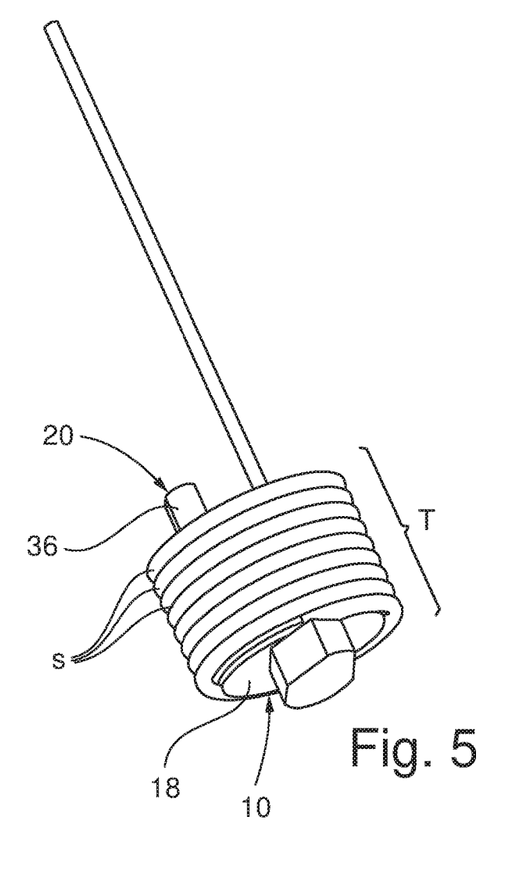
Figure 6:
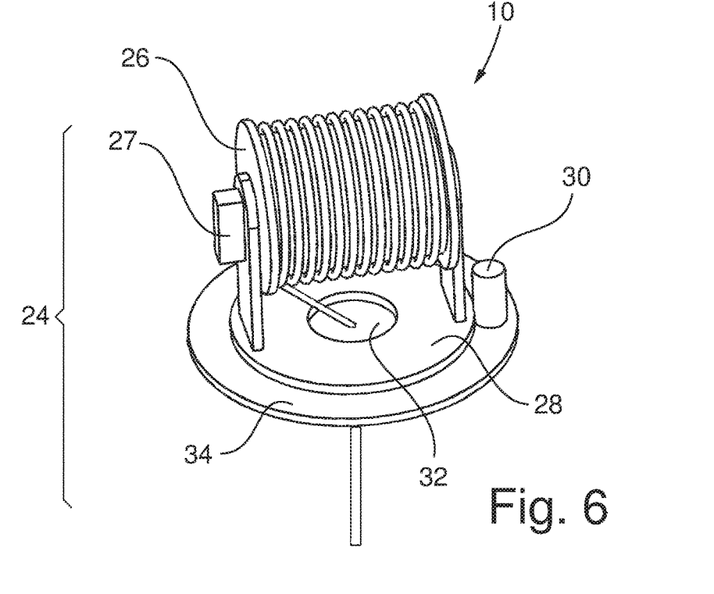
FIG. 6 is a perspective view of a further component of the system shown in the preceding figures.
Figure 7:
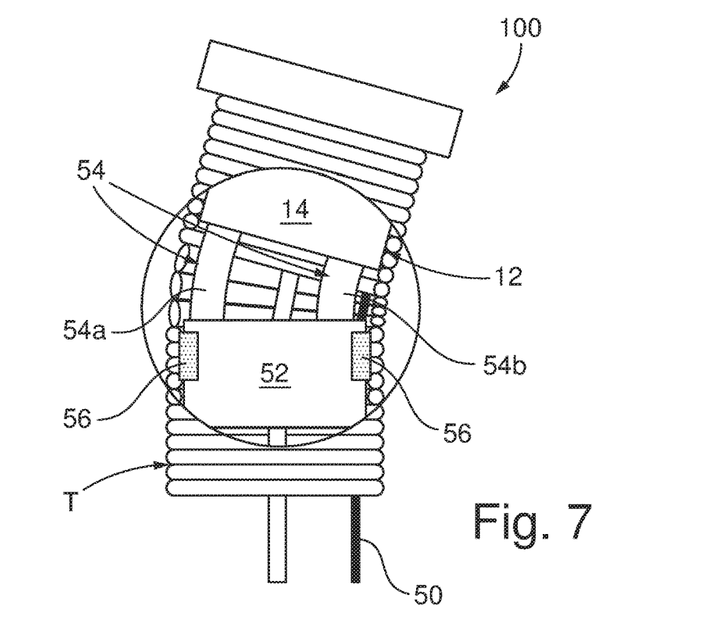
FIG. 7 is a side elevation view of a system for non-destructive penetration of a substrate designed in accordance with a further embodiment of the present invention.

With reference to FIG. 6, system 10 optionally comprises a collection assembly 24 for storing and supplying to distribution apparatus 18 the hardenable material to be distributed at the periphery of perimetric edge 16.

In the illustrated embodiment, collection assembly 24 is located in a remote position relative to excavation assembly 11. It is however conceivable, as an alternative, that the collection assembly be integral with one or more components of excavation assembly 11; in such a case, the collection assembly may be made, for example, rotatably integral with distribution apparatus 18.

In particular, collection assembly 24 can be firmly secured in a position external to the substrate (whether the latter is the soil, as in drilling applications, or a patient's body or the operating table, as in medical applications) to be subjected to non-destructive penetration.

In the illustrated embodiment, the material stored in collection assembly 24 is, by way of example, in the form of a wire or a thread, in particular, as aforementioned, a cotton thread. Preferably, collection assembly 24 comprises a spool 26 around which the hardenable or solidifiable material in the form of wire or thread to be supplied to distribution apparatus 18 is wound, which is then unwound in a controlled manner during the operation of system 10, particularly as a function of the movement carried out by distribution apparatus 18.

In particular, during the operation of system 10 the thread that is unwound from spool 26 starts from collection assembly 24 and crosses tubular structure T being formed, to then enter axial cavity 14b defined by hollow body 12, thus arriving at distribution apparatus 18. In particular, the rotation of spool 26 is controlled by a motor 27, e.g. an electric motor. In this case, the rotation of motor 27 determines the speed at which the hardenable or solidifiable material is fed through outlet passage 22 of said distribution apparatus 18.

In the illustrated embodiment, spool 26 rotates about an axis which is transversal, in particular substantially perpendicular, to the axis of rotation of distribution apparatus 18.

Preferably, spool 26 is also rotatable about an axis that is substantially parallel to (in particular, coincident with) the one about which distribution apparatus 18 (in the illustrated embodiment, disk 21) is adapted to rotate, particularly in a way controllable as a function of the direction and/or revolution speed of the latter.

Through this expedient it is possible to counter the generation of axial torsional stresses in the thread being fed to distribution apparatus 18, in that the rotary motion of distribution apparatus 18 tends to twist the thread coming from collection assembly 24, with the risk of creating undesired knots or curves in the thread itself.

More in detail, in the illustrated embodiment collection assembly 24 also comprises a rotatable base 28 whereon spool 26 is fixedly mounted, which is rotatable about an axis that is substantially parallel to (in particular, coincident with) the one about which distribution apparatus 18 (in the illustrated embodiment, disk 21) is adapted to rotate.

In particular, rotatable base 28 is rotatably controlled by a motor 30, e.g. an electric motor (possibly in cooperation with a gear). In the illustrated embodiment, two motors 27 and 30 are provided in combination with collection assembly 24, which are separated from each other and are respectively associated with spool 26 and with rotatable base 28. However, in implementation variants not shown herein the two motors may be replaced with a single motor capable of controlling the rotation of spool 26 and of rotatable base 28, possibly through the use of suitable transmission members.

In the embodiment illustrated in FIGS. 1 to 6, the thread wound around spool 26 is not originally equipped with the above-described adhesive coating or glue. In this case, system 10 is provided with a chamber 32 containing the substance adapted to contribute to the formation of said coating; in particular, said substance may be in liquid form. Preferably, said chamber 32 is provided in collection assembly 24.

In particular, collection assembly 24 may include a fixed base 34 that can be firmly constrained to the substrate to be subjected to non-destructive penetration, intended for supporting the various components of collection assembly 24. For example, on fixed base 34 rotatable base 28 is rotatably mounted and associated motor 30 is installed; on rotatable base 28, instead, spool 26 is rotatably mounted, particularly by means of two brackets (not numbered) located at the ends of the latter, which is in turn rotatably controlled by motor 27.

As will be apparent to a man skilled in the art, in implementation variants of the present invention, not shown herein, the construction of the collection apparatus can be changed based on the hardenable or solidifiable material in use. For example, if the hardenable or solidifiable material includes a substance in paste or gel form, the collection apparatus may be a vessel adapted to contain such material, possibly integral with the excavation assembly. In such a case, the outlet passage of the distribution apparatus can be associated with suitable pumping means or motorized pistons tending to push said material contained in the vessel towards the outlet passage.

Preferably, motor apparatus 20 comprises a motor 36, e.g. an electric motor, and a transmission 38 adapted to transfer the mechanical power generated by motor 36 in order to create a movement in distribution apparatus 18, guided by supporting body 12.

In the embodiment shown in FIGS. 1 to 6, transmission 38 is a gear mechanically cooperating between motor 36 and distribution apparatus 18, in particular between motor 36 and disk 21. Preferably, transmission 38 comprises an epicyclic gearing, in particular located inside cylindrical side wall 14.

Said epicyclic gearing comprises, for example:
- a stationary crown wheel 38*a* fitted with an internal toothing and movable in a unitary manner with supporting body 12, in particular with side wall 14 thereof, and
- a plurality of satellite gears 38*b* that can be rotatably driven by motor 36, meshing with the stationary crown wheel 38*a* and rotatably supported by distribution apparatus 18, in particular by disk 21 (acting as a gear train plate).

In the embodiment shown in FIGS. 1 to 6, the satellite gears 38*b* surrounded by stationary crown wheel 38*a* are three and have respective axes of rotation located at the vertices of an equilateral triangle.

In this embodiment, the epicyclic gearing does not include a planetary sun pinion simultaneously meshing with all satellite gears 38*b* for inducing a rotary motion in distribution apparatus 18. In particular, motor 36 is instead adapted to directly transmit the motion to only one of satellite gears 38*b*, which in turn meshes with stationary crown wheel 38*a*.

According to the structure of the illustrated epicyclic gearing, when motor 36 is in operation satellite gears 38*b* move along stationary crown wheel 38*a* and turn distribution apparatus 18, in particular by rotating disk 21.

Preferably, said epicyclic gearing created by stationary crown wheel 38*a* and satellite gears 38*b* of transmission 38 is axially constrained to supporting body 12.

In particular, said axial constraint can be obtained by means of a pair of disks 40, 42 arranged on axially opposed sides of satellite gears 38*b*, whereon the latter are rotatably supported, e.g. by axial through pins (not numbered). Furthermore, the periphery of such disks 40, 42 is superimposed on axially opposed sides on the stationary crown wheel 38*a*.

In turn, such disks 40, 42 are secured, e.g. screwed, to each other and rotate in a unitary manner with distribution apparatus 18, in particular with disk 21.

In the embodiment shown in FIGS. 1 to 6, motor 36 can receive power through a pair of sliding contacts 44 which are supported in a sliding manner over a respective pair of conductive tracks 46, which are supplied with electric power capable of operating motor 36 and are formed on supporting body 12, in particular on the inner surface of side wall 14.

Preferably, sliding contacts 44 are carried by an arm 48 (FIG. 2) protruding from motor 36, e.g. elastically preloaded against conductive tracks 46, so as to maintain an electric connection with them.

In the illustrated embodiment, the pair of conductive tracks 46 defines a closed path, in particular a circular one, formed on the inner surface of side wall 14, on which sliding contacts 44 can slide.

In particular, power can be supplied to conductive tracks 46 by means of a pair of wires 50, e.g. coming from an electric power generator (not shown) located in a position remote from system 10. Preferably, wires 50 run through supporting body 12, e.g. at side wall 14, and are connected to conductive tracks 46.

As an alternative to the above solution, power may also be supplied to motor 36 by fitting system 10 with accumulators or batteries capable of autonomously supplying power to motor 36.

Preferably, supporting body 12 is equipped with radial locking means for locking excavation assembly 11 relative to tubular structure T generated by it. The radial locking means may optionally comprise at least one pair of side spacers 51 transversally facing outwards and adapted to elastically press against tubular structure T that surrounds the supporting body, particularly at the proximal portion of side wall 14. In the illustrated embodiment, side spacers 51 include claws that can exert friction within tubular structure T, possibly by getting into it.

More specifically, side spacers 51 are pivoted on the periphery of supporting body 12, particularly of side wall 14. For example, the articulation of side spacers 51 may be provided by means of a flexible joint or a hinge interposed between each spacer 51 and supporting body 12.

The function of side spacers 51 is essentially to prevent excavation assembly 11 from undergoing an undesired radial shift with respect to tubular structure T, while at the same time allowing the same excavation assembly to move axially. Moreover, the elasticity of side spacers 51 in an outward radial direction makes this expedient applicable to tubular structures T of different diameters obtainable from system 10.

With reference to FIGS. 7 to 10, reference numeral 100 designates as a whole a system according to a further embodiment of the present invention.

Those parts or elements which are similar to or which perform the same function as those of the above-described embodiment have been assigned the same reference numerals. For simplicity, the description of such parts or elements will not be repeated below, and reference will be made to the above description of the previous embodiment.

System 100 comprises diverting means for changing the direction followed by excavation assembly 11 during the non-destructive penetration of the substrate. In the embodiment shown in FIGS. 1 to 6, in fact, system 10 tends to maintain, in operation, a substantially straight excavation direction, in particular tending to coincide with the axis of side wall 14.

Said diverting means allow tubular structure T being generated to be bent and oriented in different directions, e.g. in order to overcome obstacles or when system 100 is used for exploration missions in the substrate subjected to non-destructive penetration.

According to one option, the diverting means are adapted to modify the arrangement of the components of said excavation assembly. According to said option, and with particular reference to FIG. 7, the diverting means comprise:

a proximal supporting body 52 spaced from supporting body 12, in particular on the side opposite to distal end or tip 14a, and axially constrainable in a controlled manner to tubular structure T (particularly to the inner surface thereof), and a mechanism 54 mechanically connecting supporting bodies 12, 52 to each other and adapted to change the inclination of said supporting bodies 12, 52 relative to each other in a controlled manner.

In this way, when proximal supporting body 52 is axially constrained to the inner surface of tubular structure T, supporting body 12 can move in a tilted direction relative to proximal supporting body 52, being carried away from supporting body 12 by mechanism 54.

Preferably, also proximal supporting body 52 has an inner cavity, as described for supporting body 12 in the preceding embodiment. In particular, said inner cavity is adapted to be crossed by thread material (e.g. coming from collection assembly 24) to be peripherally distributed by distribution apparatus 18. Moreover, said cavity is also crossed by wires 50 that supply electric power to motor device 20.

In particular, mechanism 54 can change its own curvature or bend in the longitudinal direction, so as to push (distal) supporting body 12 and rotate it away from proximal supporting body 52, thus diverting the axis of penetration through the substrate of system 100.

In particular, mechanism 54 comprises a plurality of longitudinally flexible or bendable uprights 54a, 54b. Such uprights 54a, 54b are connected on one side to supporting body 12, and on the other side to proximal supporting body 52, and their flexing and bending in the longitudinal direction can be adjusted in a controlled manner.

Preferably, proximal supporting body 52 is peripherally fitted with fastening means 56 adapted to extend radially outwards, so as to be able to engage with the inner surface of tubular structure T, thereby preventing the latter from sliding axially.

In the illustrated embodiment, said fastening means 56 are extended radially, e.g. by actuators (in particular, electromagnetic ones) or electric motors (in particular direct-current ones) when mechanism 54 is operating to change the direction in which the non-destructive penetration of the substrate by system 100 is taking place. This prevents any undesired sliding that might adversely affect the change of direction of system 100.

According to an alternative option, which differs from the one wherein the diverting means are adapted to modify the arrangement of the components of excavation assembly 11, said diverting means are adapted to vary in a controlled manner the modes of distribution of the hardenable or solidifiable material by distribution apparatus 18. In particular, the thickness and/or the torsional state of the hardenable or solidifiable material distributed by distribution apparatus 18 are controlled, possibly by adjusting the flow rate of said material as it exits the distribution apparatus.

Figure 8:
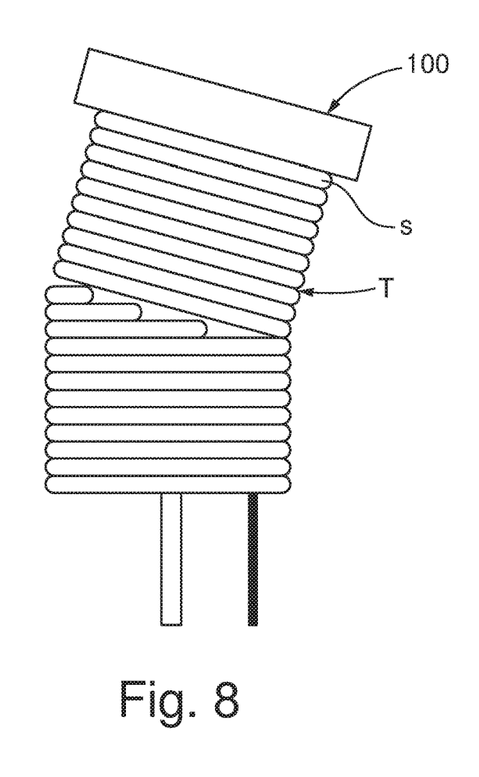
FIGS. 8, 9 and 10 are side elevation views of different variants of the tubular structure that can be created during the drilling steps carried out by the system shown in FIGS. 7 and 8.
Figure 9:
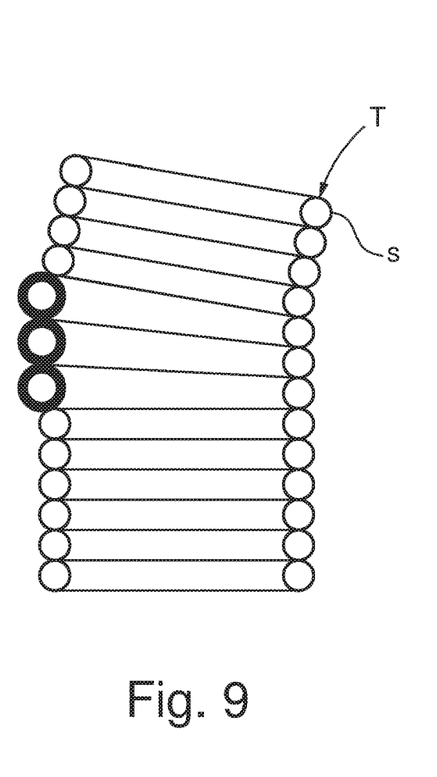
Figure 10:
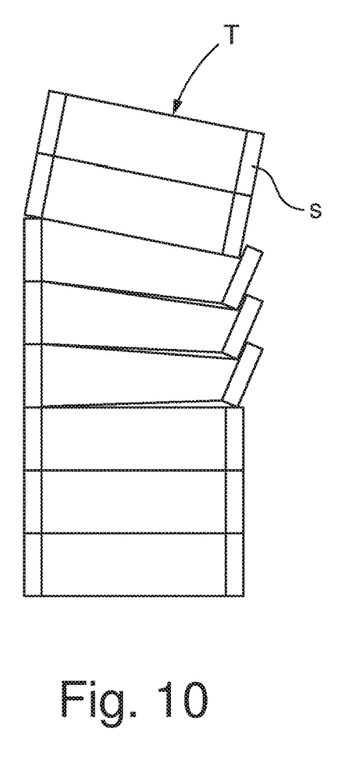

With reference to FIGS. 8 to 10, there are shown tubular structures T created by using a system wherein the change of direction is attained through diverting means in accordance with said alternative option.

In particular, in FIGS. 8 and 9 said tubular structures T are obtained by varying the flow rate at which the hardenable material is fed by distribution apparatus 18, in order to induce an asymmetry in annular layers s or coils of tubular structure T itself.

In FIGS. 8 and 9, the change of direction occurs when distribution apparatus 18 feeds the flow of hardenable material in an uneven manner along the perimeter defined by perimetric edge 16.

Figure 11:
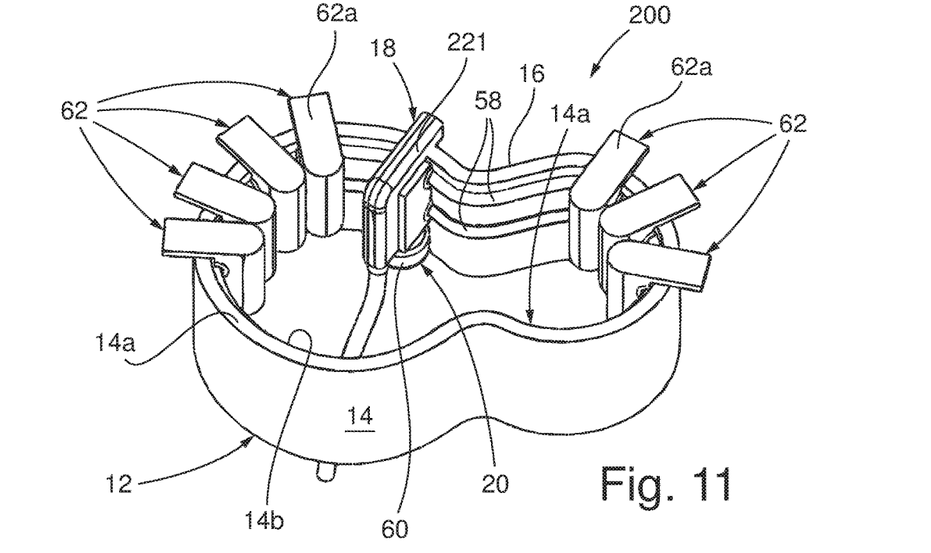
FIGS. 11 and 12 are perspective bottom views of a system for non-destructive penetration of a substrate designed in accordance with another embodiment of the present invention.
Figure 12:
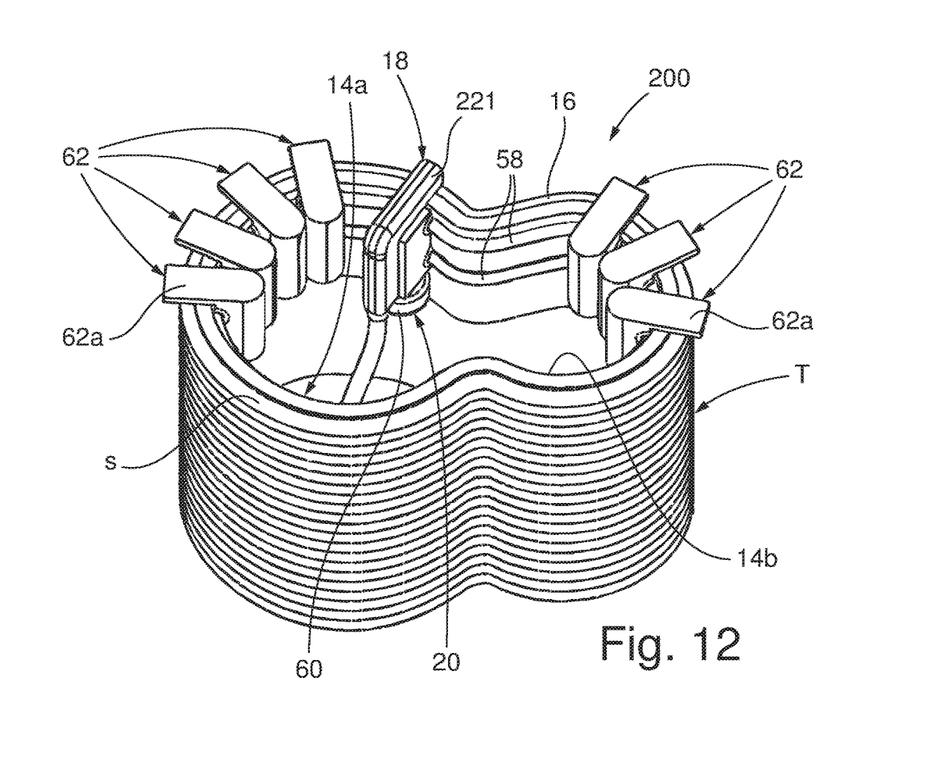

With reference to FIG. 8, a case will now be taken into account wherein distribution apparatus 18 is equipped with a peripheral nozzle (e.g. which can be provided in a way similar to that shown in FIGS. 11 and 12), adapted to distribute the hardenable material, wherein said material is not in thread form, but in hardenable or solidifiable powder, paste, gel or liquid form.

In order to create tubular structure T, the peripheral nozzle stops the feeding of the hardenable material in some sections of annular layers s (or coils) of tubular structure T, so as to create an asymmetric structure. In this manner, stacked annular layers s will be affected by the partial absence of hardenable material, so that tubular structure T will tend to bend and deviate, tilting to the side where annular layers s lack hardenable material.

Once the desired inclination has been achieved, the peripheral nozzle will feed again the quantity of hardenable material in a homogeneous manner.

With reference to FIG. 9, tubular structure T illustrated therein can be obtained both when a peripheral nozzle is used for feeding hardenable material comprising a powder, paste, gel or liquid substance and when distribution apparatus 18 is adapted to feed a thread.

If a peripheral nozzle is used, it will be operated in such a way as to increase the thickness of the hardenable material being fed (e.g. by increasing the flow rate) in some sections of annular layers s (in particular created as coils) of tubular structure T, so as to form an asymmetric structure. As it happens in the situation shown in FIG. 8, stacked annular layers s are affected by the partial excess of hardenable material in some sections, and hence tubular stricture T will tend to bend and deviate, tilting to the side where annular layers s have less hardenable material. In this case as well, once the desired inclination has been achieved, the peripheral nozzle will feed again the quantity of hardenable material in a homogeneous manner.

If the hardenable material being fed is a thread, instead, the quantity of coating (adhesive or glue) deposited around said thread is increased along some sections of annular layers s, e.g. by adjusting—in particular, decreasing—the speed of the thread as it passes through chamber 32 containing the substance used for forming said coating (so that the thread will be impregnated more deeply). This implies that said sections of annular layers s will become thicker that the rest, thus inducing the same behaviour of tubular structure T as previously described.

With reference to FIG. 10, tubular structure T illustrated therein can be obtained when distribution apparatus 18 is adapted to feed a thread.

In such a case, the asymmetric configuration of annular layers s is obtained by subjecting some sections of the thread to axial torsion as it is fed by distribution apparatus 18, e.g. by creating, during some working steps, a difference between the revolution speed of spool 26 and the revolution speed of distribution apparatus 18 determined by motor 20.

With reference to FIGS. 11 and 12, reference numeral 200 designates as a whole a system according to a further embodiment of the present invention.

Those parts or elements which are similar to or which perform the same function as those of the above-described embodiments have been assigned the same alphanumeric references. For simplicity, the description of such parts or elements will not be repeated below, and reference will be made to the above description of the previous embodiments.

In this embodiment, side wall 14 does not have a circular cross-section, but it has—merely by way of example—a substantially figure-of-eight shaped cross-section.

Therefore, also in light of the fact that said cross-section is not circular, the guided coupling between distribution apparatus 18 and supporting body 12 occurs differently from the preceding embodiments. In particular, distribution apparatus 18 has, instead of the disk, a peripheral nozzle 221 through which the material can be fed outwards, e.g. drawn or extruded through an outlet hole associated with peripheral nozzle 221, from which the flow of material can be started or stopped.

In particular, peripheral nozzle 221 can be heated in order to warm up the material flowing therethrough. In this manner, distribution apparatus 18 can provide a thread of "sticky" material that will tend to arrange itself into the plurality of axially superimposed annular layers s—in a substantially continuous manner—under the action of motor device 20. Of course, it is preferable that said thread will tend to harden quickly after exiting through the hole of peripheral nozzle 221, so that tubular structure T will be formed in a short time.

The cross-section of the outlet hole of peripheral nozzle 221 may be adjustable in a per se known manner, so as to be able to vary the thickness of the hardenable or solidifiable material being fed by the distribution apparatus.

Distribution apparatus 18, and in particular peripheral nozzle 221, is slideably mounted on a guide rail 58 provided on supporting body 12, defining in particular a closed path.

Preferably, guide rail 58 has a substantially annular shape and is located on the inner surface of side wall 14, defining a closed path for peripheral nozzle 221, which follows the profile of the cross-section of side wall 14.

Preferably, system 200 comprises a pair of such guide rails 58, which are axially spaced apart and are made of electrically conductive material, thus also performing the function of conductive tracks 46 of the embodiment shown in FIGS. 1 to 6. In this manner, the guide system and the power supply for distribution apparatus 18 are integrated together. In further implementation variants it is also conceivable to keep the guide system and the power supply for the distribution apparatus separate from each other.

In this embodiment, motor 20 is integral with peripheral nozzle 221 and is adapted to control the rotation of a wheel 60 in contact with the inner surface of side wall 14, so that it will follow perimetric edge 16 as distribution apparatus 18 moves. Alternatively, wheel 60 may be replaced with a pinion meshing with an internal toothing carried by the inner surface of side wall 14.

Preferably, distribution apparatus 18 also includes a plurality of rib elements 62 mounted at distal end 14a and slideably guided by side wall 14 (e.g. through guide rails 58) along the same path followed by peripheral nozzle 221. In particular, rib elements 62 comprise a transversal tongue 62a protruding outwards beyond perimetric edge 16 of side wall 14.

In this embodiment, said rib elements 62 merely perform a passive function, in that they are made to slide along perimetric edge 16 by the operation of peripheral nozzle 221 and by the deposition of the hardenable or solidifiable material. In particular, the respective transversal tongues 62a are essentially used for levelling the surfaces of annular layers s of tubular structure T as soon as they have been distributed by peripheral nozzle 221. This improves the regularity and uniformity of the deposition by stratification of tubular structure T.

Figures 13, 14:
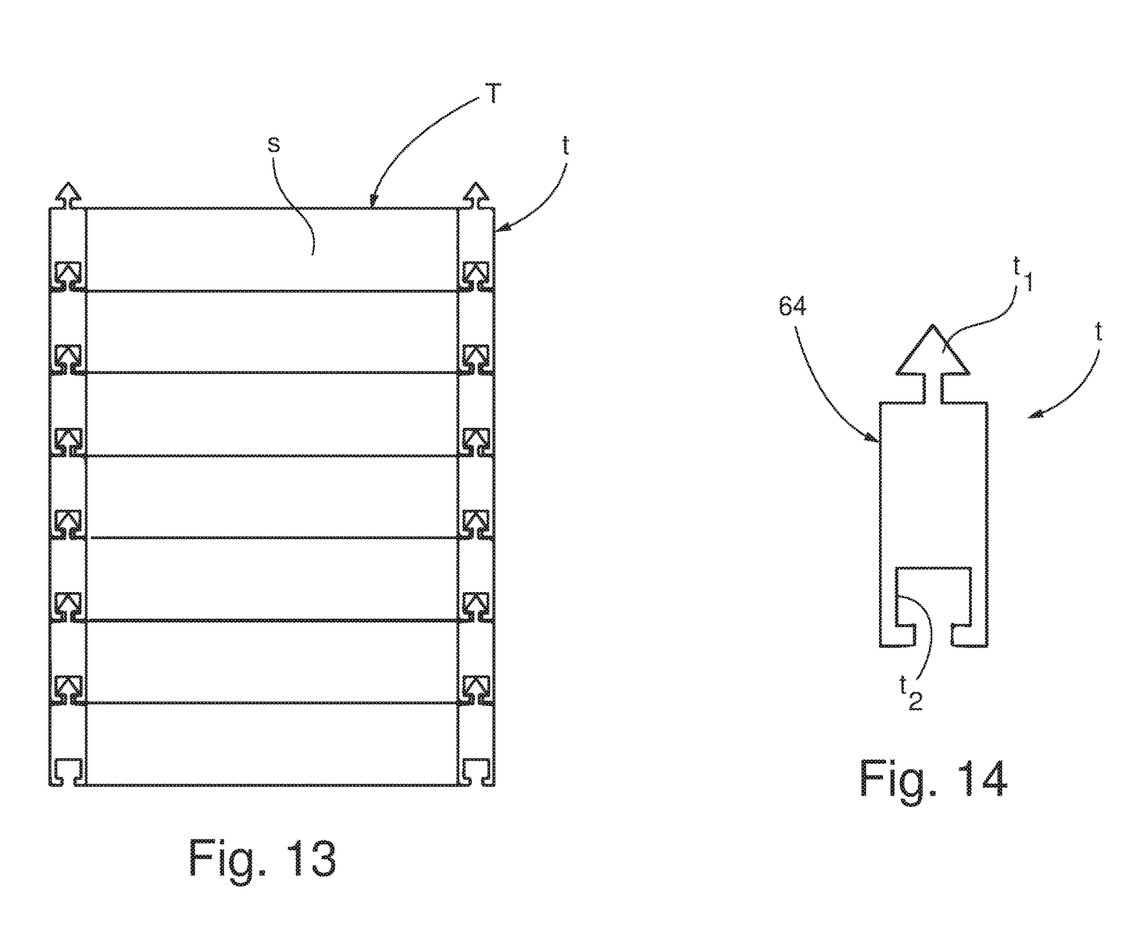
FIGS. 13 and 14 are longitudinal views of a variant of the tubular structure that can be created during the drilling steps carried out by the systems shown in the preceding figures.

With reference to FIGS. 13 and 14, there is shown one possible tubular structure T made out of annular layers s, each having a particular cross-section t of the threads that compose said structure T.

In particular, FIG. 14 illustrates cross-section t of the thread that composes annular layers s, e.g. the coils shown in FIG. 13. Said cross-section t is substantially of the interlocking type, i.e. it can be mechanically constrained to the section of the upper or lower axially adjacent coils.

Preferably, on axially opposed sides of the coils that form annular layers s, section t has a male portion t1 that can be coupled to an associated female portion t2, thus creating a shape coupling during the distribution performed by peripheral nozzle 221.

This solution could even avoid the use of chemical or polymeric adhesives to be applied between the coils of tubular structure T, since the cross-sections of the coils would per se be "self-coupling".

One possible expedient useful for obtaining coil cross-sections of this type is to provide a distribution apparatus 18 having an outlet passage 22 adapted to feed the hardenable or solidifiable material and ending with a profiled orifice 64, cross-section t of which has complementary shapes t1, t2 on opposite sides, e.g. of the male-female type. In this manner, upper or lower adjacent annular layers s of hardenable or solidifiable material, drawn or extruded through said profiled orifice 64, can be fitted one into the other, e.g. in a male-female fashion.

The technical characteristics that differentiate the various embodiments and variants thereof described and illustrated herein are freely interchangeable, whenever compatible.

Of course, without prejudice to the principle of the invention, the forms of embodiment and the implementation details may be extensively varied from those described and illustrated herein by way of non-limiting example, without however departing from the scope of the invention as set out in the appended claims.

The invention claimed is:

1. A system for non-destructive penetration of a substrate, said system comprising an excavation assembly, the excavation assembly comprising:
    a supporting body having a perimetric edge defining a closed path;
    a distribution apparatus at least partly protruding transversally relative to said perimetric edge, movable in a guided manner on said supporting body, and for transversally distributing a quantity of hardenable or solidifiable material towards an outside of said perimetric edge, and adapted to lay a plurality of axially superimposed annular layers of said hardenable or solidifiable material defining a tubular structure around said excavation assembly; and
    a motor device for moving said distribution apparatus on said supporting body.

2. The system according to claim 1, wherein said supporting body comprises a side wall carrying said perimetric edge.

3. The system according to claim 2, wherein said side wall has a distal end that defines said perimetric edge.

4. The system according to claim 2, wherein said side wall has an axial cavity through which said distribution apparatus is accessible from the outside.

5. The system according to claim 4, wherein said axial cavity passes through said side wall.

6. The system according to claim 1, wherein said distribution apparatus is rotoidally coupled to said supporting body.

7. The system according to claim 6, wherein the distribution apparatus comprises a discoidal element at least partially protruding transversally relative to said perimetric edge and equipped with a radial outlet passage and adapted to distribute said hardenable or solidifiable material.

8. The system according to claim 1, wherein said supporting body comprises at least one guide rail, on which said distribution apparatus is slideably mounted.

9. The system according to claim 1, wherein said motor device comprises a motor and a transmission for transferring mechanical power generated by said motor in order to move said distribution apparatus, guided by said supporting body.

10. The system according to claim 9, wherein said transmission comprises a gear.

11. The system according to claim 10, wherein said gear comprises an epicyclic gearing interposed between said supporting body and said distribution apparatus.

12. The system according to claim 1, wherein said motor device is arranged to rotatably drive a wheel, which is rotatably supported by said distribution apparatus and which is in contact, by rotation or meshing, with said supporting body.

13. The system according to claim 1, wherein said motor device is an electric motor.

14. The system according to claim 13, wherein said motor device is movable in a unitary manner with the distribution apparatus and comprises a pair of sliding contacts which are slidably supported over a pair of conductive tracks formed on said supporting body.

15. The system according to claim 1, further comprising a collection assembly for storing and supplying to the distribution apparatus said hardenable or solidifiable material.

16. The system according to claim 15, wherein said collection assembly is situated in a remote position relative to said excavation assembly.

17. The system according to claim 16, wherein said collection assembly is mountable in a fixed manner relative to said substrate.

18. The system according to claim 15, wherein the collection assembly comprises a spool around which said hardenable or solidifiable material is wound in the form of wire or thread to be supplied to said distribution apparatus; said material being controllably unwound as a function of the movement carried out by said distribution apparatus.

19. The system according to claim 1, further comprising a diverter for changing the direction followed by said excavation assembly during the non-destructive penetration of the substrate.

20. The system according to claim 19, wherein said diverter is adapted to modify an arrangement of components of said excavation assembly.

21. The system according to claim 20, wherein said diverter comprises: a proximal supporting body spaced from said supporting body and axially constrainable in a controlled manner to said tubular structure, and a mechanism mechanically connecting said supporting body and said proximal supporting body and capable of tilting said supporting body and said proximal supporting body relative to each other.

22. The system according to claim 19, wherein said diverter is adapted to controllably vary modes of distribution of the hardenable or solidifiable material distributed by said distribution apparatus by controlling thickness and/or a torsional state thereof.

23. The system according to claim 1, wherein said distribution apparatus has an outlet passage for distributing said hardenable or solidifiable material ending with a profiled orifice with a cross-section having complementary shapes on opposite sides, so that the upper or lower adjacent annular layers of said hardenable or solidifiable material, drawn or extruded through said profiled orifice, can be fitted one into the other.

* * * * *